M. J. YAMPOLSKY.
PROCESS OF MAKING ARTIFICIAL FUEL.
APPLICATION FILED NOV. 18, 1908.

926,449.  Patented June 29, 1909.

UNITED STATES PATENT OFFICE.

MICHEL J. YAMPOLSKY, OF ST. LOUIS, MISSOURI.

PROCESS OF MAKING ARTIFICIAL FUEL.

No. 926,449.  Specification of Letters Patent.  Patented June 29, 1909.

Application filed November 18, 1908. Serial No. 463,136.

*To all whom it may concern:*

Be it known that I, MICHEL J. YAMPOLSKY, a citizen of the United States, and resident of St. Louis, Missouri, have invented certain new and useful Improvements in Processes of Making Artificial Fuel, of which the following is a specification containing a full, clear, and exact description, reference being had to the accompanying drawings, forming a part hereof.

My invention relates to a process of making artificial fuel, the object of my invention being to produce an artificial fuel to be used as a fire lighter, by an improved process which can be quickly and cheaply carried out.

Figure 1:
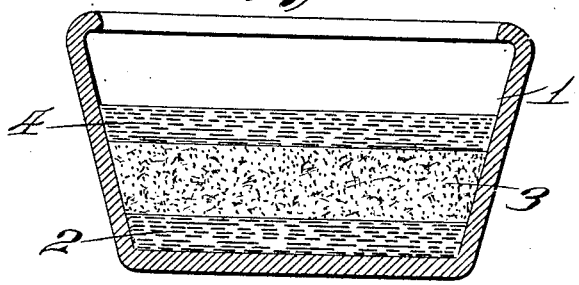
Figure 2:
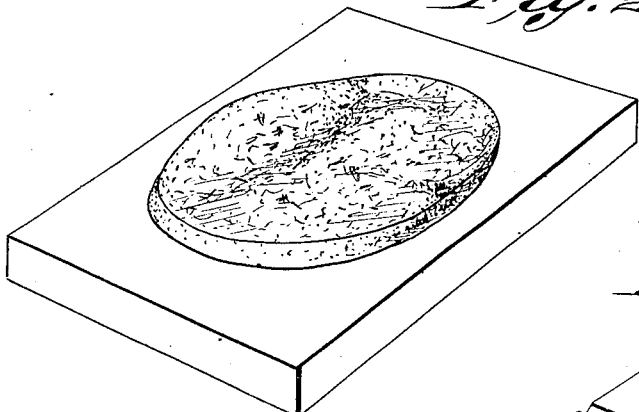
Figure 3:
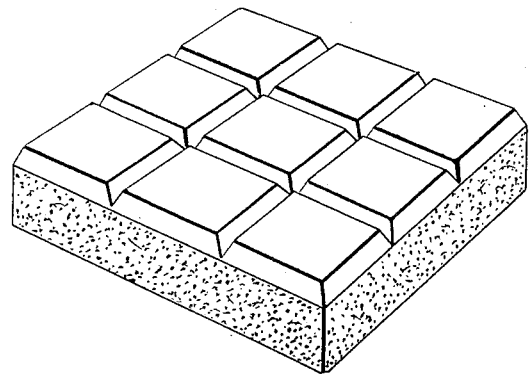
Figure 4:
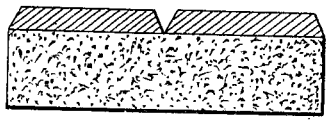

In the accompanying drawings, Figure 1 is a sectional view of a receptacle in which the ingredients forming the artificial fuel are heated and mixed; Fig. 2 is a perspective view of a slab or plate on which the mixture is rolled and cooled; Fig. 3 is a perspective view of a section of the fuel as manufactured by my improved process; Fig. 4 is a vertical section taken through a block of the fuel.

In the manufacture of artificial fuel by my improved process I utilize a large container 1 in the form of a tank or kettle, and in which is placed a quantity of rosin 2, which readily melts upon the application of heat to the container 1, and when this rosin has been entirely melted a quantity of practically dry sawdust 3 is placed within the container on the melted rosin, after which a second body of melted rosin 4 is poured into the container 1 on top of the body of dry sawdust. The sawdust placed on the body of rosin 2 is practically dry and therefore floats or rests on top of the body of melted rosin, although, of course, a few of the particles of saw-dust in the lowermost strata will soon become impregnated with rosin and will then gradually sink to the bottom of the body of melted rosin but the greater portion of the body of saw-dust will remain on top of the body of melted rosin, and after the second layer of melted rosin is placed on top of the body of saw-dust, which action takes place immediately after the saw-dust is placed on the lowermost body of melted rosin, the heat from the two layers of melted rosin will act upon the confined body of sawdust to expel a certain per cent. of the volatile matter in said saw-dust, which action is shown by bubbles which form on top of the top layer of melted rosin.

For all practical purposes I prefer to use approximately equal parts by weight of sawdust and rosin, although in some instances the proportions may vary slightly.

After the rosin and sawdust are placed in the container, the same is heated until a temperature of approximately 210° is obtained, and this heat is maintained for a period of over thirty minutes, during which time the particles of sawdust expand and all of the air and volatile matter is discharged therefrom, which air and volatile matter escape through the top layer 4 of rosin. This action necessarily opens the pores in the sawdust and the rosin and sawdust are now mixed by continued stirring until each particle of sawdust is thoroughly saturated with rosin and this action causes each individual particle of sawdust to absorb a certain amount of melted rosin to take the place of the air and volatile matter expelled by the heat during the time the sawdust was subjected to the heat of 210°.

After the sawdust and rosin have been thoroughly mixed, the entire mass within the container is poured onto a large plate or slab, the surface of which has been previously oiled, and when said mass has become partially cooled and hardened, it is rolled in order to bring the entire mass or body to an even thickness, after which the entire body is blocked off into small rectangular sections by means of a knife or marker. As the entire body of the fuel cools, the sawdust impregnated with the rosin will settle toward the bottom of the mass in such a manner as to leave a thin layer of comparatively clear or pure rosin at the top of the body, which, when the entire mass is thoroughly cooled, forms a hard crust on the top of the artificial fuel.

Artificial fuel manufactured by my improved process is clean, practically odorless and smokeless, and as each particle of sawdust is thoroughly coated and impregnated with rosin, perfect combustion is obtained, which, as is well known, produces a high degree of heat.

I claim—

The herein described process of making artificial fuel, consisting in providing melted rosin in the bottom of a receptacle, placing a quantity of dry saw-dust on top of the body of melted rosin, then placing a second body of melted rosin on top of the body of sawdust, then applying sufficient heat to the entire mass to expel the volatile matter from the saw-dust, then thoroughly mixing the saw-dust and rosin to cause the particles of saw-dust to absorb a portion of the melted rosin, then placing the mixture on a plate or slab and finally rolling the body of the mixture to an even thickness.

In testimony whereof, I have signed my name to this specification, in presence of two subscribing witnesses.

MICHEL J. YAMPOLSKY.

Witnesses:
M. P. SMITH,
E. L. WALLACE.